(12) United States Patent
Artigue et al.

(10) Patent No.: US 8,995,576 B2
(45) Date of Patent: Mar. 31, 2015

(54) METHOD AND MODULE FOR ESTIMATING FREQUENCY BIAS IN A DIGITAL-TELECOMMUNICATIONS SYSTEM

(75) Inventors: Cédric Artigue, Toulouse (FR); Christophe Fourtet, Pompignan (FR); Marc Vertes, Saint-Lys (FR)

(73) Assignee: SIGFOX, Labege (FR)

( * ) Notice: Subject to any disclaimer, the term of this patent is extended or adjusted under 35 U.S.C. 154(b) by 0 days.

(21) Appl. No.: 14/129,579

(22) PCT Filed: Jul. 5, 2012

(86) PCT No.: PCT/EP2012/063194
§ 371 (c)(1),
(2), (4) Date: Apr. 4, 2014

(87) PCT Pub. No.: WO2013/007613
PCT Pub. Date: Jan. 17, 2013

(65) Prior Publication Data
US 2014/0219325 A1 Aug. 7, 2014

(30) Foreign Application Priority Data

Jul. 11, 2011 (FR) ...................... 11 56304

(51) Int. Cl.
*H04L 27/00* (2006.01)
*H04L 27/06* (2006.01)
(Continued)

(52) U.S. Cl.
CPC .......... *H04L 25/022* (2013.01); *H04L 27/2338* (2013.01); *H04L 2027/0067* (2013.01)
USPC .......................................... 375/326; 375/340

(58) Field of Classification Search
CPC ............... H04L 2027/0022; H04L 2027/0028; H04L 27/2657; H04L 27/266; H04L 7/033; H04W 56/0035
USPC .......................... 375/219, 220, 326, 340, 342
See application file for complete search history.

(56) References Cited

U.S. PATENT DOCUMENTS 5,245,611 A * 9/1993 Ling et al. ...................... 370/347
5,390,216 A * 2/1995 Bilitza et al. ................... 375/354
(Continued)

OTHER PUBLICATIONS

International Application No. PCT/EP2012/063194, International Search Report, dated Aug. 10, 2012.
Bergogne et al., "Reduced Complexity Frequency Estimator for Burst Transmission", IEEE Global Telecommunications Conference, vol. 2, Nov. 13-17, 1995, New York, pp. 1318-1322.

(Continued)

*Primary Examiner* — Don N Vo
(74) *Attorney, Agent, or Firm* — Heslin Rothenberg Farley & Mesiti P.C.; George S. Blasiak, Esq.

(57) ABSTRACT

The invention relates to a method for estimating frequency bias negatively affecting a digital signal representative of a symbol frame, wherein said method comprises the steps of: generating the digital signal at a sampling period Te that is shorter than a predefined period of each of the symbols of the frame; calculating values for a plurality of pairs of samples of the digital signal, each value being representative of a phase difference between the samples of a pair; estimating the frequency bias negatively affecting the digital signal on the basis of the values calculated for Np pairs of samples selected such that a plurality of said Np pairs belong strictly to a single symbol in the frame. The present invention also relates to a module for implementing the estimation method, as well as to a telecommunication method and system.

8 Claims, 3 Drawing Sheets

(51) Int. Cl.
*H04L 25/02* (2006.01)
*H04L 27/233* (2006.01)

(56) References Cited

U.S. PATENT DOCUMENTS 5,581,582 A * 12/1996 Choi .............................. 375/344
6,567,480 B1    5/2003 Brardjanian et al.
7,702,040 B1 *  4/2010 Yuan et al. .................... 375/326
2005/0125176 A1 * 6/2005 Makhlouf et al. .............. 702/69

OTHER PUBLICATIONS

Bellini, S., "Digital Frequency Estimators for M-PSK", $3^{rd}$ European Conference on Satellite Communications—ECSC-3, Jan. 1, 1993, UK, pp. 362-366.

Zhang et al., "Cyclostationarity-based Symbol Timing and Carrier Frequency Offset Estimation for OFDM System" IEEE International Conference on Computer Application and System Modeling, Oct. 22, 2010, New Jersey, pp. V5-V546.

* cited by examiner

METHOD AND MODULE FOR ESTIMATING FREQUENCY BIAS IN A DIGITAL-TELECOMMUNICATIONS SYSTEM

CROSS REFERENCE TO RELATED APPLICATIONS

This application is a national stage filing under section 371 of International Application No. PCT/EP2012/063194, filed on Jul. 5, 2012, and published in French on Jan. 17, 2013, as WO 2013/007613 and claims priority of French application No. 1156304 filed on Jul. 11, 2011, the entire disclosure of these applications being hereby incorporated herein by reference.

FIELD OF THE INVENTION

The present invention relates to the field of digital telecommunications. The present invention more specifically relates to the estimating of a frequency bias negatively affecting a frame of symbols transmitted by a terminal and received by a station of a digital telecommunication system.

STATE OF THE ART

The invention can be particularly advantageously used in wireless telecommunications on a carrier frequency.

"On a carrier frequency" means that the transmission of a frame of symbols by a terminal comprises a step of frequency shifting of said frequency frame, aiming at modifying a central frequency of the frequency spectrum of the frequency frame.

Indeed, a frame of symbols is in practice generated around a zero frequency, in "baseband", and the frame of symbols has to be shifted in order to be around a non-zero carrier frequency, in particular for frequency resource sharing reasons.

The transmission of a frame of symbols on a carrier frequency is performed in the form of a radio-frequency signal, which is then received by a station of the telecommunication system. The station then has to extract the data transmitted by the terminal, which extraction comprises, in particular, one or several steps of shifting the radio-frequency signal frequency, aiming at bringing the frame of symbols back to baseband, as well as a step of analog-to-digital (A/D) conversion of the received signal to extract the data with digital calculation means.

However, the digital signal, representative of the radio-frequency signal received by the station, is generally negatively affected by a frequency bias which, if it is not sufficiently compensated, disturbs the data extraction.

Such a frequency bias may especially result from:
- a frequency drift of frequency synthesis means of the terminal, causing an error on the central frequency of the frequency spectrum of the transmitted radio-frequency signal, which is different from the desired carrier frequency,
- an error in the estimate of the central frequency of the frequency spectrum of the radio-frequency signal at the station,
- a frequency drift of frequency synthesis means of the terminal, causing an error on the central frequency used to shift the frequency of the received radio-frequency signal to bring the frame of symbols back to baseband,
- a relative displacement of the terminal with respect to the station, which goes along with an unwanted frequency shifting of the frequency spectrum of the radio-frequency signal, known as Doppler effect, etc.

Accordingly, the digital signal, from which the data transmitted by the terminal are to be extracted, may be negatively affected by a frequency bias corresponding to a difference between a supposed central frequency of the frequency spectrum of the digital signal, generally the zero frequency, and a real central frequency of said frequency spectrum of the digital signal.

FIG. 1 shows an example of disturbances introduced by a residual frequency bias negatively affecting a digital signal corresponding to a BPSK (Binary Phase Shift Keying) frame of symbols. This drawing shows that the amplitude of the BPSK symbols strongly varies, and that a sign inversion of said BPSK symbols may occur. It should thus be understood that, if the frequency bias is not estimated and corrected, the performance of the extraction of data transmitted by the terminal will be very adversely affected.

The insertion of training sequences into the frame of symbols is known, especially in cell mobile telecommunication systems such as GSM (Global System for Mobile Communications). A training sequence is a set of symbols known offhand by the terminal and the station and which accordingly do not correspond to useful data transmitted by the terminal. Due to the fact that the station knows the symbols forming such training sequences, it can estimate the frequency bias by comparison of the training sequences with the symbols of the digital signal corresponding to the training sequences.

However, the insertion of such training sequences decreases the efficiency of the data exchange between a terminal and a station, which efficiency corresponds to the ratio of useful data (that is, data which are not known offhand by the receiving station) per frame.

SUMMARY OF THE INVENTION

The present invention aims at providing a solution enabling to estimate a frequency bias negatively affecting a digital signal which does not require inserting training sequences in a frame of symbols (that is, the frequency bias can be estimated "blindly").

The present invention can be advantageously used, without this being a limitation, in low bit rate telecommunication systems where the transmitted frames comprise a small number of symbols, for example, at least a few tens of symbols.

The present invention also more generally aims at providing a digital telecommunication system where the terminals are simple and inexpensive to implement.

According to a first aspect, the invention relates to a method of estimating a frequency bias negatively affecting a digital signal representative of a frame of symbols transmitted by a terminal to a station of a digital telecommunication system, said frequency bias corresponding to a difference between a supposed central frequency of a frequency spectrum of the digital signal and a real central frequency of said frequency spectrum. According to the invention, the estimation method comprises the steps of:
- generating the digital signal by sampling of an analog signal, representative of the frame of symbols, with a sampling period Te shorter than a predefined duration of each of the frame symbols, such that the digital signal comprises at least three samples per symbol,
- estimating the frequency bias negatively affecting the digital signal according to values calculated for Np pairs of samples selected so that several of said Np pairs necessarily belong to a same symbol of the frame, each value being representative of a phase difference between the samples of the considered pair of samples, the samples of each of the Np pairs being separated by a same non-zero number D of sampling periods.

Due to the fact that the digital signal comprises at least three samples per symbol, it should be understood that it is possible to have several pairs having their samples all belonging to a same symbol (by selecting D such that the digital signal comprises at least two consecutive pairs of samples per symbol). For example, if the digital signal comprises exactly three samples per symbol, then each symbol will comprise two pairs of samples by selecting D equal to one.

The phase difference between two samples belonging to a same symbol being independent from the symbol phase, it should be understood that it is advantageous, in order to "blindly" estimate the frequency bias, to consider values calculated for pairs of samples belonging to a same symbol. Further, by considering several pairs of samples belonging to a same symbol, it should be understood that the frequency bias can be estimated even if the frame comprises a small number of symbols.

According to specific embodiments, the frequency bias estimation method comprises one or a plurality of the following characteristics, taken alone or in all technically possible combinations.

Preferably, the frequency bias is estimated according to values calculated for Np pairs of samples selected so that all the samples of said Np pairs necessarily belong to at most two consecutive samples of the frame. Preferably, number D is equal to one, so that a single pair, from among the Np pairs of samples, may be formed of samples belonging to different symbols.

Preferably, sampling period Te is such that the digital signal comprises at least ten samples per symbol, preferably at least one hundred samples per symbol.

Preferably, frequency bias $f_{EST}$ is estimated according to the following relation:

$$f_{EST} = \frac{1}{2 \cdot q \cdot D \cdot \pi \cdot Te} \cdot \arg\left(\sum_{n=0}^{Np-1} (r(n_0 + D + n) \cdot r^*(n_0 + n))^q\right) - F_0$$

where:
- r(n) is a sample of the digital signal corresponding to sampling time n·Te, $r(n_0)$ being the first sample of the samples of the Np considered pairs,
- r*(n) is the conjugate complex of r(n),
- arg(x) corresponds to the phase of complex number x,
- q is either equal to one, or equal to an even number,
- $F_0$ is the supposed central frequency of the digital signal.

Preferably, a plurality of estimates of the frequency bias are performed according to values calculated for different sets of pairs of samples, and the method comprises a step of low-pass filtering of said estimates of the frequency bias.

According to a second aspect, the invention relates to a telecommunications method data exchange between a terminal and a station of a digital telecommunication system, said data being exchanged in the form of a frame of symbols. The telecommunications method comprises the steps of:
- transmission, by the terminal, of a frame of symbols in the form of a radio-frequency signal having its instantaneous frequency spectrum of a width smaller than a frequency drift of frequency synthesis means of said terminal,
- reception of said radio-frequency signal by the station,
- estimating a frequency bias negatively affecting a digital signal representative of the radio-frequency signal in accordance with an estimation method according to the invention,
- compensating for the frequency bias negatively affecting the digital signal according to the estimate of said frequency bias,
- extracting the data transmitted by the terminal.

According to a third aspect, the invention relates to a module for estimating a frequency bias negatively affecting a digital signal representative of a frame of symbols transmitted by a terminal to a station, said frequency bas corresponding to a difference between, on the one hand, a supposed central frequency of a frequency spectrum of the digital signal and, on the other hand, a real central frequency of said frequency spectrum. According to the invention, the estimation module comprises means configured to estimate the frequency bias negatively affecting the digital signal in accordance with an estimation method according to the invention.

According to a fourth aspect, the invention relates to a station of a digital telecommunication system, said station comprising a frequency bias estimation module according to the invention.

According to a fifth aspect, the invention relates to a digital telecommunication system comprising:
- a station according to the invention,
- at least one terminal configured to transmit data in the form of radio-frequency signal shaving an instantaneous frequency spectrum of a width smaller than a frequency drift of frequency synthesis means of said at least one terminal.

DESCRIPTION OF THE DRAWINGS

The present invention will be better understood on reading of the following description provided as an example only in relation with the accompanying drawings, among which.

DETAILED DESCRIPTION OF EMBODIMENTS

Figure 1:
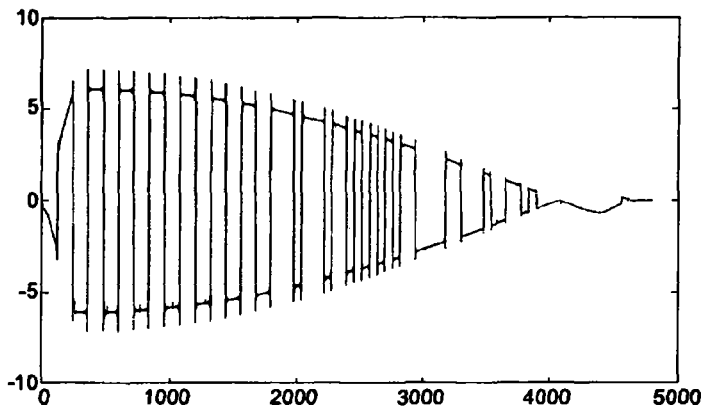
FIG. 1: already described, an example of disturbances introduced by a residual frequency bias negatively affecting a digital signal.
Figure 2:
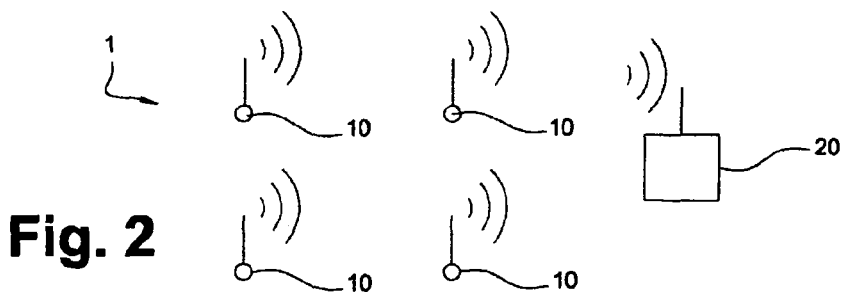
FIG. 2: a simplified representation of a telecommunication system comprising a station and a plurality of terminals.

FIG. 2 very schematically shows a telecommunication system 1 comprising several terminals 10 and a station 20.

In the context of the invention, "station" generally designates any receiver device capable of receiving radio-frequency signals. Station 20 for example is any of terminals 10, or a specific device such as a point of access to a wire or wireless telecommunications network, centralizing the data transmitted by each of terminals 10.

"Radio-frequency signal" designates an electromagnetic wave propagating via wireless means, having its frequencies in the traditional radio-frequency wave spectrum (from a few hertz to several hundreds of gigahertz) or in neighboring frequency bands.

It should be noted that the case of a data transmission from terminals 10 to station 20 is mainly considered. The possible data transmission from station 20 to terminals 10 does not pertain to the framework of the invention.

Terminals 10 comprise means for transmitting radio-frequency signals considered as known by those skilled in the art. Each radio-frequency signal preferably is a single-carrier radio-frequency signal (as opposed to a multi-carrier radio-frequency signal of OFDM—Orthogonal Frequency Division Multiplexing—type). Further, a terminal 10 preferably comprises a central processing unit comprising a processor connected to one or a plurality of electronic memories having computer program code instructions stored therein. According to certain embodiments, a terminal 10 comprises one or several programmable logic circuits of FPGA, PLD, CPLD, or other type.

Station 20 comprises means for receiving radio-frequency signals considered as known by those skilled in the art. Further, station 20 preferably comprises a central processing unit of the type comprising a processor connected to one or a plurality of electronic memories having computer program code instructions stored therein. According to certain embodiments, station 20 comprises one or several programmable logic circuits of FPGA, PLD, CPLD, or other type.

The present invention first relates to a method 30 of estimating a frequency bias representative of a frame of symbols emitted by a terminal 10, said estimation method being implemented at station 20.

Figure 3:
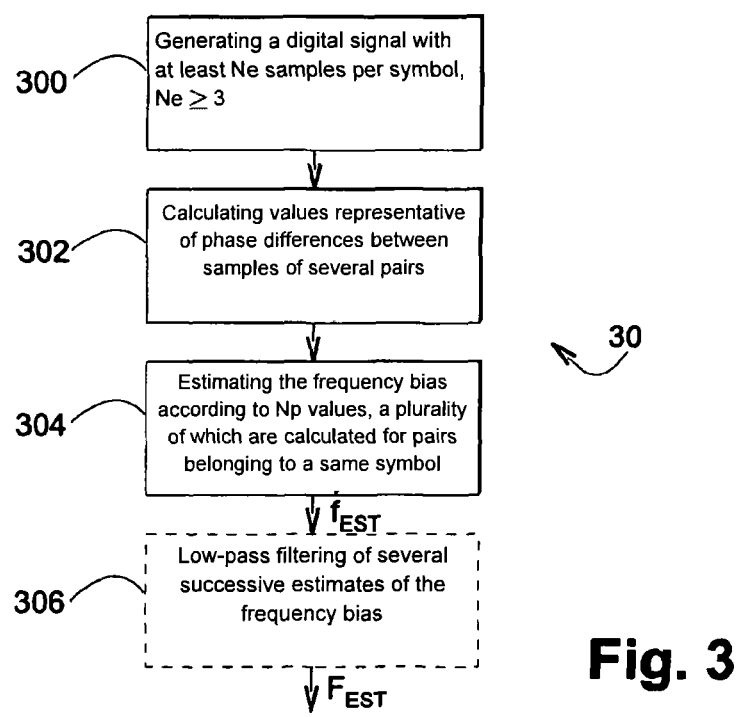
FIG. 3: a diagram schematically showing the main steps of a frequency bias estimation method.

FIG. 3 schematically shows the main steps of such an estimation method 30, which are:
- 300 obtaining the digital signal by sampling of an analog signal representative of the frame of symbols transmitted by terminal 10,
- 302 calculating values for a plurality of pairs of samples of the digital signal, each value being representative of a phase difference between the samples of a pair of samples,
- 304 estimating the frequency bias negatively affecting the digital signal according to values calculated for several pairs of samples.

During step 300 of obtaining the digital signal, the sampling of the analog signal is performed with a sampling period Te shorter than a predefined duration of each of the frame symbols.

Thereby, it is ascertained that the digital signal comprises several samples per symbol. Sampling period Te is selected, as compared with duration Ts, so that the digital signal comprises at least Ne samples per symbol, Ne being greater than or equal to three.

Ne is defined as being equal to the integer part of ratio Ts/Te, so that the digital signal will generally comprise Ne samples per symbol, but may also comprise (Ne+1) samples per symbol. The following description considers the non-limiting case where Ts is proportional to Te, so that the digital signal always comprises Ne samples per symbol.

Preferably, sampling period Te is selected so that Ne is much greater than three, for example, equal to or greater than ten, or even one hundred. The advantage of having such values of Ne is that the frequency bias estimation can be improved and/or accelerated.

It should further be understood that, in the case of a low bit rate telecommunication system where the transmitted frames comprise a small number of symbols, the fact of having a plurality of samples per symbol enables to compensate for the fact that the frames comprise few symbols usable to estimate the frequency bias.

Step 300 enables to obtain a digital signal formed of several samples, the sample corresponding to time n·Te being designated hereafter as r(n). Sample r(n) can for example be expressed as follows, neglecting possible additional noise:

$$r(n) = s\left(E\left(\frac{n+nd}{Ne}\right)\right) \cdot e^{j \cdot 2 \cdot \pi \cdot (F_0 + fd) \cdot n \cdot Te} \quad (e1)$$

Expression (e1)) is an approximate expression where:
- fd is the frequency bias affecting the digital signal,
- j is the imaginary unit (such that $j^2 = -1$),
- E(x) corresponds to the integer part of x,
- s(m) is the symbol at time m·Ts,
- nd represents a time shift, representative of the fact that the times of transition between a frame symbol and the next symbol of this frame,
- $F_0$ is a supposed central frequency of the frequency spectrum of the digital signal.

It should be noted that supposed central frequency $F_0$ may for example be:
- the carrier frequency of the radio-frequency signals transmitted by terminal 10; in such a case, the sampled analog signal corresponds to the signal received on the carrier frequency, which is possible if the carrier frequency is not too high (so that it can be oversampled in order to have at least three samples per symbol, or even more),
- an intermediate frequency, lower than the carrier frequency, back to which the signal received on the carrier frequency has been taken,
- the zero frequency, in which case the digital signal is said to be in "baseband".

The rest of the description considers the non-limiting case where the transmitted symbols are BPSK symbols and the case where s(m)=±1.

During step 302, values representative of phase differences between the samples of said pairs are calculated for a plurality of pairs of samples of the digital signal. The samples of each considered pair are separated by a same non-zero number D of sampling periods.

Further, D is selected so that the digital signal comprises a plurality of different pairs of samples per symbol of the frame. Two pairs of samples are different as soon as they have at most one common sample. In practice, to ascertain that the digital signal comprises at least two pairs of different samples per symbol of the frame, D should be equal to or smaller than (Ne−2).

In a preferred embodiment, the calculated values are the following:

$$g(n) = r(n+D) \cdot r^*(n)$$

According to expression (e1), the calculated values g(n) can be expressed as follows:

$$g(n) = s\left(E\left(\frac{n+D+nd}{Ne}\right)\right) \cdot s^*\left(E\left(\frac{n+nd}{Ne}\right)\right) \cdot e^{j \cdot 2 \cdot \pi \cdot (F_0 + fd) \cdot D \cdot Te} \quad (e2)$$

It should be understood that, if samples r(n+D) and r(n) belong to the same BPSK symbol, then:

$$s\left(E\left(\frac{n+D+nd}{Ne}\right)\right) \cdot s^*\left(E\left(\frac{n+nd}{Ne}\right)\right) = 1$$

and:

$$g(n) = e^{j \cdot 2 \cdot \pi \cdot (F_0 + fd) \cdot D \cdot Te}$$

In this case, the only unknown value is frequency bias fd.

If, on the contrary, samples r(n+D) and r(n) do not belong to the same BPSK symbol, then:

$$s\left(E\left(\frac{n+D+nd}{Ne}\right)\right) \cdot s^*\left(E\left(\frac{n+nd}{Ne}\right)\right) = \pm 1$$

and:

$$g(n) = \pm e^{j \cdot 2 \cdot \pi \cdot (F_0 + fd) \cdot D \cdot Te} \quad (e3)$$

In this case, a π phase jump adds when the BPSK symbols to which samples r(n+D) and r(n) belong do not have the same value. The values of said symbols are not known offhand when it is not a training sequence, so that it is not known offhand whether the phase jump is present.

In all cases, the calculated values g(n) are however well representative of the phase difference between samples r(n+D) and r(n).

Nothing excludes, according to other examples, considering other expressions for the calculation of said values representative of the phase difference between samples of a pair.

During step 304, the frequency bias negatively affecting the digital signal is estimated according to Np values calculated for pairs of samples selected so that several of said Np pairs necessarily belong to a same symbol of the frame.

It should indeed be understood that since the digital signal comprises Ne samples per symbol and D is selected so that the digital signal comprises several different pairs of samples per symbol in the frame, the Np pairs can easily be selected so that a plurality of said Np pairs belong to a same symbol.

This will necessarily be the case when successive pairs of samples are considered, that is, pairs {r(n+D+k),r(n+k)}, with 0≤k≤Np−1.

It should be understood that, by selecting the Np pairs of samples so that a plurality of samples belong to a same symbol, the number of values capable of comprising a phase jump such as previously discussed in reference to expression (e3) is considerably decreased.

In a particularly preferred embodiment, the frequency bias is estimated according to values calculated for Np pairs of samples selected so that all the samples of said Np pairs necessarily belong to at most two consecutive symbols of the frame. This is for example true when only considering consecutive pairs of samples, and selecting Np so that Np Ne-D+1.

In preferred embodiments, D is equal to one (D=1) to maximize the number of pairs of samples per symbol, in particular when consecutive pairs of samples are considered (each symbol comprising at least (Ne-D) consecutive pairs of samples).

In a preferred embodiment, the frequency bias is estimated by means of values calculated for consecutive pairs of samples, the first sample of which is sample r(n₀), according to the following expression:

$$f_{EST} = \frac{1}{4 \cdot D \cdot \pi \cdot Te} \cdot \arg\left(\sum_{n=0}^{Np-1} (r(n_0 + D + n) \cdot r^*(n_0 + n))^2\right) - F_0 \quad (e4)$$

It should be noted that, in expression (e4), values g(n) are squared, so that in the case of BPSK symbols, a phase jump, possibly introduced when the samples of a pair belong to two consecutive symbols, is suppressed.

More generally, the frequency bias can be estimated according to the following expression:

$$f_{EST} = \frac{1}{4 \cdot q \cdot D \cdot \pi \cdot Te} \cdot \arg\left(\sum_{n=0}^{Np-1} (r(n_0 + D + n) \cdot r^*(n_0 + n))^q\right) - F_0 \quad (e5)$$

where q is an even integer equal to or greater than two, so that in the case of BPSK symbols, a phase jump possibly introduced when the samples of a pair belong to two consecutive symbols, is suppressed.

It should be noted that it is also possible to consider, in expression (e5), a number q equal to one. Indeed, due to the fact that the Np pairs of samples are selected so that several of said pairs belong to a same symbol, the presence of possible phase jumps in certain values can however be suppressed.

For example, in the case of Np consecutive pairs of samples, Np being selected to be equal to (Ne−D+1):

$$\arg\left(\sum_{n=0}^{Ne-D}\binom{r(n_0 + D + n) \cdot}{r^*(n_0 + n)}\right) = \arg((Ne - D \pm 1) \cdot e^{j \cdot 2 \cdot \pi \cdot (F_0 + fd) \cdot Te}) \quad (e6)$$

Accordingly:

$$\arg\left(\sum_{n=0}^{Ne-D} (r(n_0 + D + n) \cdot r^*(n_0 + n))\right) = 2 \cdot \pi \cdot (F_0 + fd) \cdot Te$$

since D is selected so that the digital signal comprises several pairs of different samples per symbol. In the case in point, the digital signal comprises (Ne−D) consecutive pairs of samples, and D accordingly is such that (Ne−D) 2, and so that (Ne−D±1)≥1. It should be understood that a number q equal to one can thus be considered, without for this to alter the performance of the estimate for BPSK symbols (to within the noise, which is not considered in the previous expressions). To improve the performance, in particular to take into account the presence of additional noise and when a number q equal to one is used (q=1), a number Ne of samples per symbol equal to or greater than ten, or even than one hundred, is advantageously considered.

In a specific embodiment, also illustrated in FIG. 3, several estimates of the frequency bias are performed according to values calculated for different sets of pairs of samples, and estimation method 30 further comprises a step 306 of low-pass filtering of said estimates of the frequency bias.

In other words, low-pass filtering step 306 aims at averaging successive estimates of the frequency bias to decrease the level of possible noise affecting the estimate.

Calling $f_{EST}(n_0)$ the estimate calculated according to expression (e5), a new estimate $F_{EST}$ is for example determined during low-pass filtering step 306 according to the following expression:

$$F_{EST}(k) = \frac{1}{Nf} \cdot \sum_{i=0}^{Nf-1} f_{EST}(k-i) \qquad (e7)$$

where Nf is the number of averaged estimates $f_{EST}(n)$. Preferably, Nf=2·Ne.

The present invention also relates to a telecommunication method of data exchange between a terminal 10 and a station 20 of telecommunication system 1.

Figure 4:
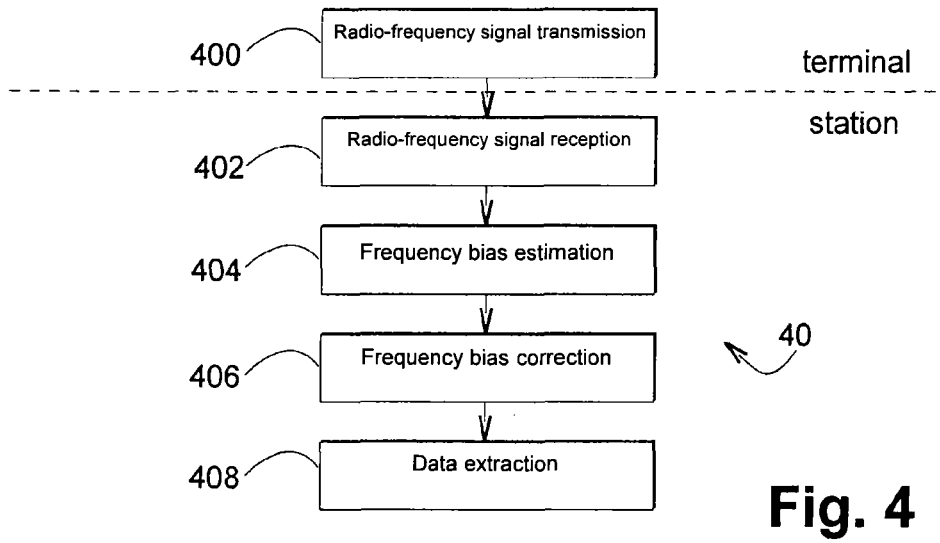
FIG. 4: a diagram schematically showing the main steps of a telecommunications method.

FIG. 4 schematically shows the main steps of a telecommunication method 40 according to the invention, which are:
- 400 transmission by terminal 10 of a frame of symbols in the form of a radio-frequency signal, preferably with a single carrier,
- 402 reception of said radio-frequency signal by station 20,
- 404 estimating a frequency bias negatively affecting a digital signal representative of the radio-frequency signal,
- 406 compensating for the frequency bias affecting the digital signal according to the estimate of said frequency bias,
- 408 extracting the data transmitted by terminal 10.

Figure 5:
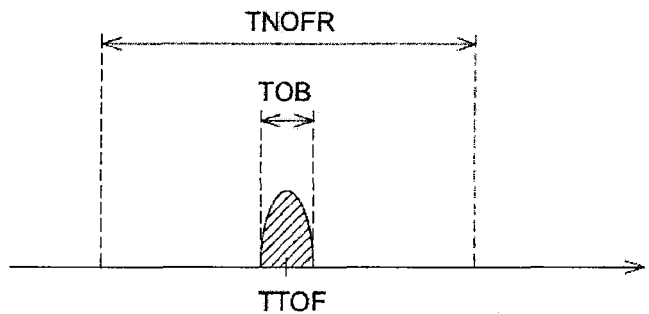
FIG. 5: a simplified representation of an example of occupation of a frequency sub-band by a radio-frequency signal transmitted by a terminal.

FIG. 5 schematically shows a frequency sub-band used by a terminal 10 to transmit a radio-frequency signal.

It should be noted that terminal 10 comprises frequency synthesis means, considered as known by those skilled in the art, implemented to shift the frequency of the signals to be transmitted on the carrier frequency.

Such a frequency sub-band is mainly determined by its central frequency, called "terminal typical operating frequency" TTOF and by its width, called "terminal natural operating frequency range" TNOFR. The natural operating frequency range, TNOFR, of a terminal 10 corresponds to the frequency range effectively occupied by a radio-frequency signal along time, taking into account a frequency drift of the frequency synthesis means of terminal 10 and taking into account the instantaneous spectral width of the radio-frequency signals transmitted by terminal 10, called "terminal occupied bandwidth" TOB.

Operating frequency range TNOFR is accordingly substantially equal to occupied bandwidth TOB plus frequency drift D (that is, TOB+D), a frequency drift D of 1 kiloHertz (kHz) being considered as corresponding to an accuracy of ±500 Hz (that is, ±D/2) around typical operating frequency TTOF.

Occupied bandwidth TOB is measured as being the bandwidth at −10 decibels (dB), that is, as being the set of frequencies for which the measured energy has an attenuation in the range from 0 dB to −10 dB with respect to the maximum energy measured for a frequency in the radio-frequency signal band. In other words, the frequencies for which the energy has an attenuation greater than −10 dB (that is, −20 dB, −30 dB, etc.) are not taken into account in the measurement of occupied bandwidth TOB.

The frequency drift of the frequency synthesis means of terminal 10 results in that the instantaneous central frequency of the spectrum of radio-frequency signals transmitted by terminal 10, called "terminal real operating frequency" TROF, may be substantially different from typical operating frequency TTOF.

Figure 6:
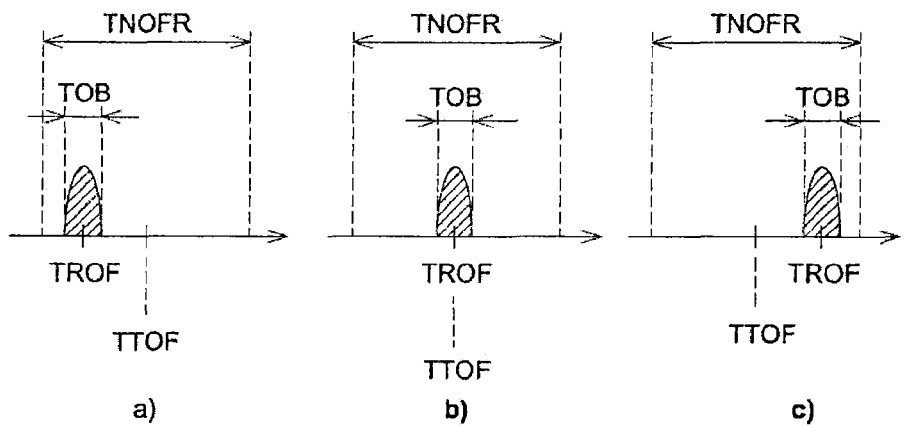
FIG. 6: a simplified representation of an example of variation, as a function of temperature, of the occupation of a frequency sub-band by a terminal.

FIG. 6 illustrates this frequency drift of real operating frequency TROF with respect to typical operating frequency TTOF due, for example, to temperature. Portions a), b), and c) show real operating frequency TROF in operating frequency range TNOFR for three different temperatures.

Preferably, the instantaneous frequency spectrum of the radio-frequency signals transmitted by terminal 10 during transmission step 400 has an occupied bandwidth TOB smaller than the frequency drift of frequency synthesis means of terminal 10, or even significantly smaller than said frequency drift.

"Significantly smaller" means that occupied bandwidth TOB is at last five times smaller than operating frequency range TNOFR. In other words, operating frequency range TNOFR of terminal 10 is, due to the frequency drift of the frequency synthesis means of said terminal, at least five times greater than bandwidth TOB of the instantaneous frequency spectrum of the radio-frequency signals transmitted by said terminal.

According to specific embodiments, occupied bandwidth TOB is at least ten times smaller than operating frequency range TNOFR, or even at least one hundred times smaller.

It should be understood that the smaller the ratio of occupied bandwidth TOB to operating frequency range TNOFR, the greater the frequency drift. It should however be understood that the greater the tolerated frequency drift, the more low-cost frequency synthesis means can be used in each of terminals 10.

Further, the lack of intrinsic frequency stability of terminals 10 (that is, their frequency drift) can be statistically taken advantage of, to decrease the probability of collision between radio-frequency signals transmitted by different terminals 10. Thus, when two terminals 10 use a same typical operating frequency TTOF, frequency drift D, which is much greater than occupied bandwidth TOB, enables to multiplex the frequency of the radio-frequency signals transmitted by these terminals 10 around the same typical operating frequency TTOF.

It should be understood that the more ratio TOB/TNOFR of occupied bandwidth TOB to operating frequency range TNOFR decreases, the more the probability of collision between radio-frequency signals transmitted by different terminals 10 decreases.

As seen, very low bit rate systems, for example, of sensor network type, are a preferred application of the invention, without this being a limitation. In the case of a very low bit rate system, called "narrow-bandwidth system", occupied bandwidth TOB is for example in the range from a few Hertz to a few hundreds of Hertz.

Operating frequency range TNOFR depends on the technology implemented to synthesize typical operating frequencies TTOF. In the case of frequency synthesis means comprising a quartz oscillator, the accuracy will for example be in the range from 2 to 40 ppm (parts per million) so that, for a typical operating frequency TTOF equal to 1 gigahertz, frequency drift D will be substantially in the range from 2 kHz (±1 kHz for the 2-ppm accuracy) to 40 kHz (±20 kHz for the 40-ppm accuracy). In this case, operating frequency range TNOFR will be substantially in the range from 2 kHz to 40 kHz. More specifically, in the case of an occupied bandwidth TOB of 100 Hz, operating frequency range TNOFR will substantially be in the range from 2.1 kHz to 40.1 kHz, and ratio TNOFR/TOB will then substantially be in the range from 21 to 401.

Figure 7:
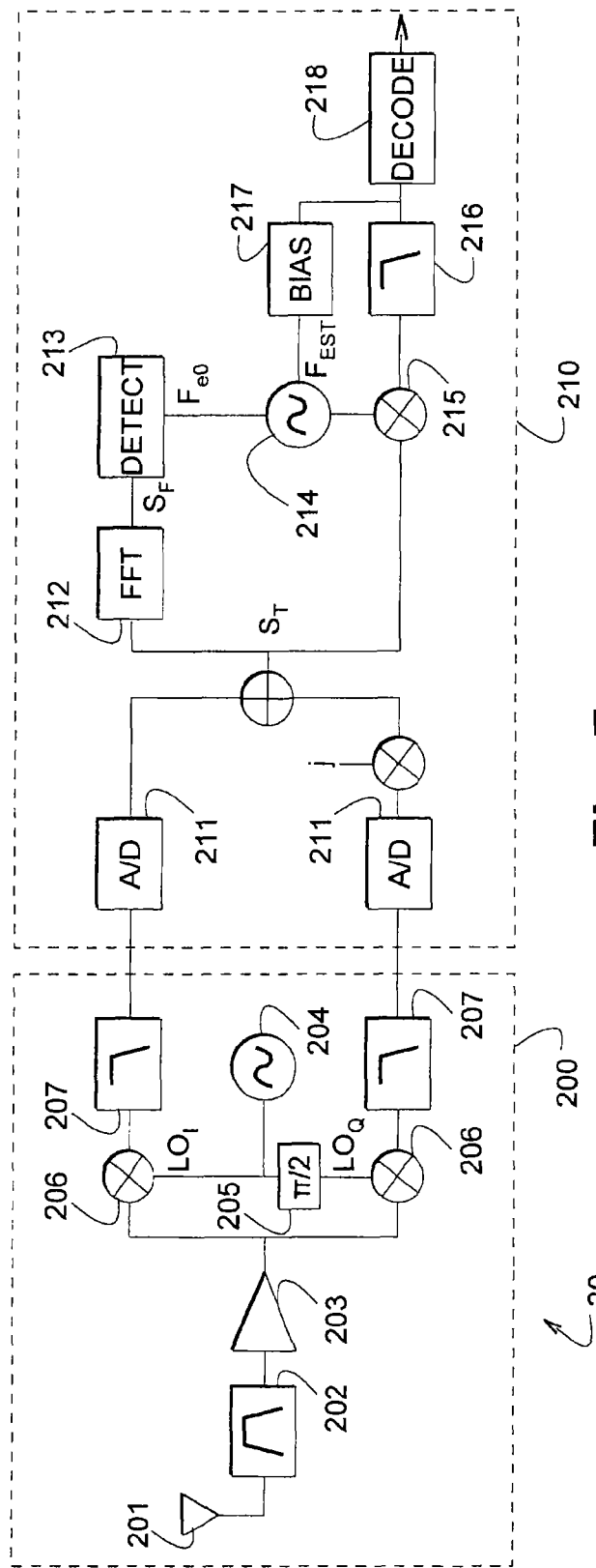
FIG. 7: a simplified representation of an embodiment of a station of the telecommunication system.

During step 402, station 20 receives the radio-frequency signal transmitted by terminal 10, by implementing means considered as known by those skilled in the art, some of which are described hereafter in reference to FIG. 7, without this being a limitation.

During step 404, frequency bias estimation method 30 according to the invention is preferably implemented.

It should be understood that when terminals 10 are provided with frequency synthesis means having a frequency drift much greater than the width of the frequency spectrum of the transmitted radio-frequency signals, the frequency bias to be estimated may vary during a same frame, or even during a same symbol. In practice, the variation of the frequency bias to be estimated can then be of the same order of magnitude as occupied bandwidth TOB.

Accordingly, the implementation of the estimation method according to the invention to estimate the frequency bias is quite advantageous.

Indeed, said estimation method 30, in particular when Ne is equal to or greater than ten, enables to estimate the frequency bias over a time period in the order of symbol duration Ts, which is much shorter than the duration of a frame (even for a frame comprising few symbols, for example, less than a few tens of symbols), or even over a time period shorter than symbol duration Ts. Sampling period Te is preferably sufficiently short for the frequency bias to be considered as substantially constant during said period Te, given the frequency drift of the frequency synthesis means of terminals 10.

Further, in the case of a narrow-bandwidth low bit rate telecommunication system (occupied bandwidth TOB in the range from a few Hertz to a few hundreds of Hertz), it should be understood that number Ne of samples per symbol may be large (for example, greater than ten) without requiring the use of too high a sampling frequency.

During step 406, the frequency bias is compensated according to the estimate of this frequency bias. Such a compensation aims at compensating for the phase variation induced from one sample to the other by said frequency bias. Such a compensation may be performed in any adapted manner known by those skilled in the art and which does not pertain to the scope of the invention.

For example, the compensation may be performed according to expression:

$$r_c(n) = r(n) \cdot e^{-j \cdot 2 \cdot \pi \cdot f_{EST} \cdot n \cdot Te}$$

or, when estimation method 30 comprises a low-pass filtering step 306, according to expression:

$$r_c(n) = r(n) \cdot e^{-j \cdot 2 \cdot F_{EST} \cdot n \cdot Te}$$

During step 408, the data transmitted by terminal 10 are determined from samples $r_c(n)$. The exact implementation of data extraction step 408 depends on a predefined protocol of shaping the data transmitted by terminals 10, and implements means considered as known by those skilled in the art.

FIG. 7 schematically shows a preferred embodiment of station 20. It should be noted that station 20 may also comprise other elements, not shown in FIG. 7.

In this non-limiting example, station 20 mainly comprises an analog unit 200 and a digital unit 210.

As illustrated in FIG. 7, analog unit 200 especially comprises:
- an antenna 201 capable of receiving radio-frequency signals in a multiplex channel MC where terminals 10 are likely to transmit,
- a bandpass filter 202, called "antenna filter", capable of filtering unwanted signals outside of multiplex channel MC,
- a low-noise amplifier 203,
- a local oscillator 204 capable of forming a substantially sinusoidal signal, called $LO_I$, having a frequency substantially equal to a central frequency of multiplex channel MC, called multiplex channel central frequency MCCF,
- a phase shifter 205 capable of forming a replica in phase quadrature of signal $LO_I$, called $LO_Q$,
- two mixers 206 capable of mixing an output signal of antenna filter 202 respectively with signal $LO_I$ and signal $LO_Q$,
- two low-pass filters 207 respectively at the output of each mixer 206, called anti-aliasing filters, having a cut-off frequency for example equal to half multiplex channel bandwidth MCB of the multiplex channel (that is, MCB/2).

As illustrated in FIG. 7, digital unit 210 particularly comprises two analog-to-digital converters (A/D) 211 capable of sampling the respective output signals of each anti-aliasing filter 207, for example, with a sampling frequency substantially equal to the multiplex channel bandwidth MCB.

The output signals of A/D converters 211 respectively correspond to the real part and to the imaginary part of a complex signal called $S_T$. This complex representation is schematized in FIG. 7 by the addition of the output signals of A/D converters 211, one of said signals being previously multiplied by imaginary unit j.

Digital unit 210 then comprises several functional units.

First, digital unit 210 comprises a FFT (Fast Fourier Transform) unit 212 capable of transposing complex signal $S_T$ from the time domain to the frequency domain, to obtain a complex signal $S_F$ representative of the frequency spectrum of complex signal $S_T$.

Digital unit 210 then comprises a detector unit 213 capable of searching in complex signal $S_F$ frequencies for which energy peaks are obtained, capable of corresponding to the presence of a radio-frequency signal transmitted by a terminal 10.

Indeed, station 20 does not necessarily know the frequencies used by the different terminals 10, in particular due to the fact that the real operating frequency TROF of a terminal 10 may be very different from the typical operating frequency TTOF of this terminal due to the frequency drift. The use of FFT unit 212 and of detector unit 213 accordingly enables to determine whether terminals 10 are transmitting radio-frequency signals and, if so, to estimate their real operating frequencies TROF.

For this purpose, FFT unit 212 should be capable of delivering a complex signal $S_F$ with a granularity in the frequency domain enabling to detect a radio-frequency signal of occupied bandwidth TOB. In the case where several occupied bandwidths are possible, the minimum occupied bandwidth $TOB_{MIN}$ is preferably considered. For example, considering a sampling frequency substantially equal to multiplex channel bandwidth MCB, FFT unit 212 is for example configured to obtain frequency samples, in the bandwidth ranging from 0 Hz to MCB, with a step equal to $MCB/TOB_{MIN}$, that is, for elementary frequencies 0, $TOB_{MIN}$, $2 \cdot TOB_{MIN}$, $3 \cdot TOB_{MIN}$, ..., $MCB - TOB_{MIN}$.

Detector unit 213 for example measures the energy for each elementary frequency. A criterion for the detection of a signal transmitted by a terminal 10 is for example verified when the power measured for an elementary frequency is greater than a predefined threshold value.

When a signal has been detected by detector unit 213, for example, around an elementary frequency of value $F_{e0}$, value $F_{e0}$ is delivered at the input of a variable local oscillator 214, which generates a complex sinusoidal signal of frequency $F_{e0}$ (comprising samples of the type $\exp(j \cdot 2 \cdot \pi \cdot F_{e0} \cdot n / MCB)$).

Complex signal $S_T$ is multiplied with the conjugate complex of the complex sinusoidal signal of frequency $F_{e0}$ by means of a multiplier unit 215. This multiplication enables to bring back the signal, detected around the elementary frequency of value $F_{e0}$, around zero frequency 0 Hz.

Digital unit 210 then comprises a low-pass filtering unit 216, having a cut-off frequency substantially equal to half occupied bandwidth TOB (that is, TOB/2). In the case where several occupied bandwidths are possible, maximum occupied bandwidth $TOB_{MAX}$ is preferably considered (that is, a cut-off frequency substantially equal to $TOB_{MAX}/2$).

Digital unit 210 then comprises a frequency bias estimation unit 217.

Estimation unit 217 comprises means configured to estimate the frequency bias negatively affecting the digital signal in accordance with an estimation method 30 according to the invention. Said means of estimation unit 217 are for example software means in the form of computer program code instructions, stored in a non-volatile memory of the central processing unit of station 20, which, when executed by said central processing unit, implement the different steps of estimation method 30.

As a variation or as a complement, said means of estimation unit 217 comprise one or a plurality of programmable logic circuits of FPGA, PLD, CPLD, or other type, configured to provide all or part of the different steps of estimation method 30.

In the non-limiting example illustrated in FIG. 7, estimated value $F_{EST}$ of the frequency bias is provided at the input of variable local oscillator unit 214. Said variable local oscillator unit then generates a complex sinusoidal signal of frequency $(F_{e0}+F_{EST})$ comprising samples of the type $\exp(j \cdot 2 \cdot \pi \cdot (F_{e0}+F_{EST}) \cdot n/MCB))$, having its conjugate complex multiplied with complex signal $S_T$ by means of multiplier unit 215.

It should be noted that estimation unit 217 may keep all the samples received from low-pass filtering unit 216, where above-mentioned sampling period Te is equal to 1/MCB. As a variation, estimation unit 217 performs a sub-sampling of the samples received from low-pass filter unit 216: in this case, above-mentioned sampling frequency Te is greater than 1/MCB, for example, equal to K/MCB, K being a predefined sub-sampling factor.

Digital unit 210 then comprises a decoder unit 218 capable of extracting the data transmitted by a terminal 10. The exact implementation of decoding unit 218 depends on a predefined protocol for shaping the data transmitted by terminals 10, and implements means considered as known by those skilled in the art.

It should be noted that detector unit 213 may have to detect several elementary frequencies capable of corresponding to signals transmitted by terminals 10. For example, detector unit 213 may have to detect a number Ns of such elementary frequencies. In this case, variable locator oscillator unit 214, multiplier unit 215, low-pass filtering unit 216, estimation unit 217, and decoder unit 218 are advantageously replicated Ns times to process in parallel the signals around each of the Ns elementary frequencies capable of being used by a terminal 10.

The above description clearly illustrates that by its different features and advantages, the present invention achieves its objects.

In particular, the invention provides a frequency bias estimation method 30 particularly adapted to narrow-bandwidth low bit rate telecommunication systems, in particular such systems where the transmitted frames comprise few symbols.

Indeed, estimation method 30 does not require training sequences, which would too significantly decrease the efficiency of the telecommunication system.

Further, estimation method 30 enables to estimate the frequency bias by considering samples in a frequency window having a duration in the order of symbol duration Ts, or even shorter than said symbol duration Ts, especially due to the fact that the processed digital signal comprises many samples per symbol. Thereby, estimation method 30 also enables to follow the frequency bias variation during a same frame of symbols. Accordingly, low-cost frequency synthesis means may be used in each of terminals 10, including means for which the frequency drift is much greater than the bandwidth TOB of the instantaneous frequency spectrum of the radio-frequency signals transmitted by terminals 10.

The invention claimed is:

1. A method of estimating a frequency bias negatively affecting a digital signal representative of a frame of symbols transmitted by a terminal to a station of a digital telecommunication system, said frequency bias corresponding to a difference between a supposed central frequency of a frequency spectrum of the digital signal and a real central frequency of said frequency spectrum, characterized in that it comprises the steps of: generating the digital signal by sampling of an analog signal, representative of the frame of symbols, with a sampling period Te shorter than a predefined duration of each of the frame symbols, such that the digital signal comprises at least three samples per symbol, estimating the frequency bias negatively affecting the digital signal according to values calculated for Np pairs of samples selected so that several of said Np pairs necessarily belong to a same symbol of the frame, each value being representative of a phase difference between the samples of the considered pair of samples, the samples of each of the Np pairs being separated by a same non-zero number D of sampling periods.

2. The method of claim 1, characterized in that the frequency bias is estimated according to values calculated for Np pairs of samples selected so that all the samples of said Np pairs necessarily belong to at most two consecutive samples of the frame.

3. The method of claim 1, characterized in that sampling period Te is such that the digital signal comprises at least ten samples per symbol, preferably at least one hundred samples per symbol.

4. The method of claim 1, characterized in that frequency bias fEST is estimated according to the following relation:

$$f_{EST} = \frac{1}{2 \cdot q \cdot D \cdot \pi \cdot Te} \cdot \arg\left( \sum_{n=0}^{N_p-1} (r(n_0 + D + n) \cdot r^*(n_0 + n))^q \right) - F_0$$

where:
r(n) is a sample of the digital signal corresponding to sampling time n·Te, r(n0) being the first sample of the samples of the Np considered pairs,
r*(n) is the conjugate complex of r(n),
arg(x) corresponds to the phase of complex number x,
q is either equal to one, or equal to an even number,
F0 is the supposed central frequency of the digital signal.

5. The method of claim 1, characterized in that number D is equal to one.

6. The method of claim 1, characterized in that a plurality of estimates of the frequency bias are performed according to values calculated for different sets of pairs of samples, and in that the method comprises a step of low-pass filtering of said estimates of the frequency bias.

7. A telecommunications method for exchanging data between a terminal and a station of a digital telecommunication system, said data being exchanged in the form of a frame of symbols, characterized in that it comprises the steps of:

transmission, by the terminal, of a frame of symbols in the form of a radio-frequency signal having its instantaneous frequency spectrum of a width smaller than a frequency drift of frequency synthesis means of said terminal, reception of said radio-frequency signal by the station, estimating a frequency bias negatively affecting a digital signal representative of the radio-frequency signal, compensating the frequency bias negatively affecting the digital signal according to the estimate of said frequency bias, extracting the data transmitted by the terminal, wherein the estimating comprises generating the digital signal by sampling of an analog signal, representative of the frame of symbols, with a sampling period Te shorter than a predefined duration of each of the frame symbols, such that the digital signal comprises at least three samples per symbol, estimating the frequency bias negatively affecting the digital signal according to values calculated for Np pairs of samples selected so that several of said Np pairs necessarily belong to a same symbol of the frame, each value being representative of a phase difference between the samples of the considered pair of samples, the samples of each of the Np pairs being separated by a same non-zero number D of sampling periods.

8. A unit for estimating a frequency bias negatively affecting a digital signal representative of a frame of symbols transmitted by a terminal to a station, said frequency bias corresponding to a difference between, on the one hand, a supposed central frequency of a frequency spectrum of the digital signal and, on the other hand, a real central frequency of said frequency spectrum, characterized in that it is configured to estimate the frequency bias negatively affecting the digital signal in accordance with an estimation method comprising generating the digital signal by sampling of an analog signal, representative of the frame of symbols, with a sampling period Te shorter than a predefined duration of each of the frame symbols, such that the digital signal comprises at least three samples per symbol, estimating the frequency bias negatively affecting the digital signal according to values calculated for Np pairs of samples selected so that several of said Np pairs necessarily belong to a same symbol of the frame, each value being representative of a phase difference between the samples of the considered pair of samples, the samples of each of the Np pairs being separated by a same non-zero number D of sampling periods.

* * * * *

UNITED STATES PATENT AND TRADEMARK OFFICE
CERTIFICATE OF CORRECTION

PATENT NO. : 8,995,576 B2  Page 1 of 1
APPLICATION NO. : 14/129579
DATED : March 31, 2015
INVENTOR(S) : Artigue et al.

It is certified that error appears in the above-identified patent and that said Letters Patent is hereby corrected as shown below:

In the Claims

Column 14, Line 56: Claim 4, Delete "F0" and insert -- $F_0$ --

Signed and Sealed this
Eleventh Day of August, 2015

Michelle K. Lee
*Director of the United States Patent and Trademark Office*